United States Patent [19]

Baetke

[11] 4,287,788
[45] Sep. 8, 1981

[54] SELF-RIGGING CABLE CONTROL SYSTEM AND PROCESS

[75] Inventor: Russell E. Baetke, Seattle, Wash.

[73] Assignee: The Boeing Company, Seattle, Wash.

[21] Appl. No.: 38,996

[22] Filed: May 14, 1979

[51] Int. Cl.³ .............................................. F16C 1/10
[52] U.S. Cl. ................................ 74/501.5 R; 244/233
[58] Field of Search .................. 74/501.5 R, 501.5 H; 244/221, 233

[56] References Cited

U.S. PATENT DOCUMENTS

| Re. 23,933 | 2/1955 | Cushman | 74/501.5 |
|---|---|---|---|
| 916,721 | 3/1909 | Kramer | |
| 2,280,105 | 4/1942 | Sturgess | 74/501.5 |
| 2,323,352 | 7/1943 | Pitts | 74/501.5 |
| 2,341,273 | 2/1944 | Helberg | 74/501.5 |
| 2,773,700 | 12/1956 | Lasswell | 74/501.5 |
| 2,774,420 | 5/1956 | Pigford | 74/501.5 |
| 2,997,636 | 8/1961 | Pell | 318/30 |
| 3,141,352 | 7/1964 | Richter | 74/501.5 |
| 3,433,089 | 3/1969 | Geyer | 74/501.5 |
| 3,473,407 | 10/1969 | Hicks | 74/501.5 |

Primary Examiner—Lawrence J. Staab
Attorney, Agent, or Firm—Ronald E. Suter; Bernard A. Donahue

[57] ABSTRACT

There is disclosed a cable control system which utilizes servo-regulation to maintain the desired cable tension. The system regulates cable tension, is self-rigging and is capable of sensing control cable failure to prevent runaway regulation.

8 Claims, 3 Drawing Figures

SELF-RIGGING CABLE CONTROL SYSTEM AND PROCESS

BACKGROUND OF THE INVENTION

1. Field of the Invention

This invention relates generally to control cable tension regulation and, more particularly, no control cable tension regulation in aircraft. Although the present invention finds particular utility in aircraft, it is to be expressly understood that the advantages of the invention are equally well manifest wherever it is desired to closely regulate the tension of a control cable, i.e. a cable capable of transmitting a control function.

2. Background of the Invention

It is known to use control cables to connect flight control surfaces with the control column in an aircraft. In this way, movement of the column by the pilot is transmitted to the control surfaces to provide aircraft attitude and direction control. Due to the limited amount of space available within the aircraft and to the physiological limitations of maximum comfortable pilot movement, input motion into the control system is limited. It is, therefore, very important to efficiently transmit this motion to the flight control surfaces by holding control signal losses, e.g., through cable stretch and system friction, to a minimum. This has become more difficult as aircraft have increased in size, and control cables have lengthened proportionally. Additional losses may be incurred due to the fact that the control cables are also subject to thermel affects and to added friction caused by deflection of the airframe along which they are mounted. To provide the desired precise response, cables are often placed under an appropriate tension which must be maintained for proper system performance.

Various types of mechanical tension regulators have been used to compensate for cable stretch and maintain the desired cable tension. These devices are severely limited in the amount of regulation movement they can provide. Once this limit is exceeded, the entire system must be re-rigged, which is a costly and time consuming process.

Since control cables are usually run in pairs to provide both positive and negative control surface deflection, cable tension arrangements must provide some means to sense cable failure, be responsive to such failure and prevent runaway regulation. This problem becomes even more critical as the amount of available regulation movement increases. Mechanical regulators frequently use a differential locking mechanism to prevent runaway regulation. These devices, however, tend to place an amount of undesirable backlash in the system, which, under certain conditions can cause slippage.

Initial rigging of a mechanically regulated system is a complex and time consuming process due to their limited regulation capability. Also, substantially the same difficulty is encountered each time re-rigging is required.

Accordingly, it is an object of the invention to provide a control cable tension regulation process and system that overcomes the disadvantages and limitations of the prior art.

It is another object of the invention to provide a control cable tension regulation system that is self-rigging at installation.

It is a further object of the invention to provide a control cable tension regulation process and system that provides increased regulation movement and improved mechanical advantage over friction.

Another object of the invention is to provide a control cable tension regulation system that produces no slip or backlash in the control mode and yet prevents runaway regulation.

It is a further object of the invention to provide a servo-type control cable tension regulation system that reduces the need for rigging maintenance.

SUMMARY OF THE INVENTION

Briefly, these and other objects are achieved in accordance with the structural aspects of an example in which control cable tension is sensed by a load cell and, responsive thereto, a control signal is transmitted to a power unit. The power unit increases or decreases cable tension in response to such signals. Means are provided to sense cable failure and prevent actuation of the power unit to avoid runaway regulation.

DESCRIPTION OF THE PREFERRED EMBODIMENTS

Figure 1:
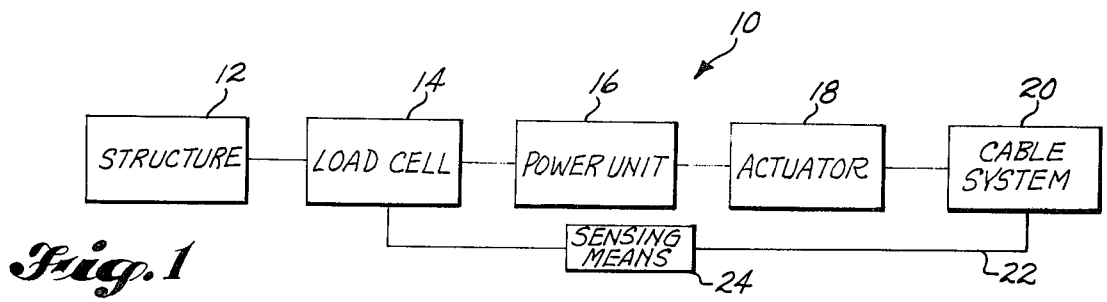
FIG. 1 is a block diagram schematically illustrating the inventive concept.

FIG. 1 illustrates the simplified concept of the inventive servo-type cable tension regulation system in block diagram form. The system is generally designated 10. Attached to a structural frame member 12 is a load cell 14 that serves to establish the desired, predetermined rigging system load or tension, detect deviations therefrom and actuate a power unit 16 to elminate such deviations. Power unit 16 operates an actuator 18 in a direction to increase or decrease tension on a cable system 20, depending on the conditions sensed by load cell 14. A feedback circuit 22 is provided between cable system 20 and load cell 14. Circuit 22 includes a load sensing means 24 to detect cable failure in cable system 20. Should a failure occur, sensing means 24 prevents operation of load cell 14 and, therefore, actuation of power unit 16. In this way runaway regulation is prevented. It is noted that circuit 22 could also extend between system 20 and a separate, direct power supply (not shown) for power unit 16.

Figure 2:
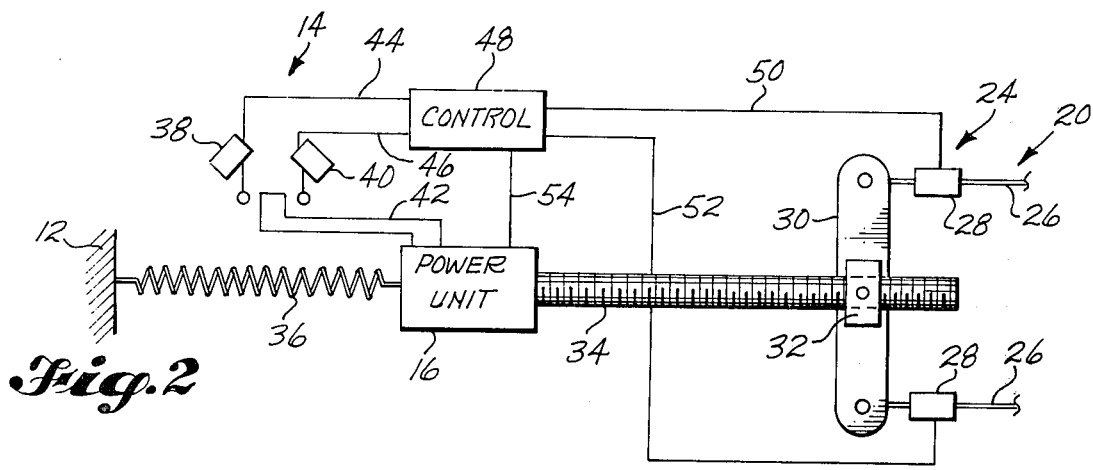
FIG. 2 illustrates the inventive concept in simplified form.

FIG. 2 illustrates a simplified embodiment of the inventive concept. As shown therein, cable system 20 includes a pair of cables 26. Sensing means 24 includes a load sensing device 28 for each cable. Cables 26 are attached to opposite ends of a crank assembly 30 which has a threaded bracket 32 pivotally secured thereon, to receive an actuator screw 34. Screw 34 is moved to the left or right, as viewed in FIG. 2, by power unit 16. Unit 16 is also movable to the left or right and is biased to the left by a spring 36 which forms part of load cell 14 and establishes the desired rigging load. Spring 36 is attached at one end to power unit 16 and at its other end to structural frame member 12. Load cell 14 also includes sensing and signaling means which, in the illustrated example, is a pair of switches 38, 40, each having a sensing or actuating arm. To actuate switches 38, 40 an arm 42 is attached to power unit 16. Switches 38, 40 are normally open and are connected via transmission lines 44, 46 respectively, to a control box 48. Similarly, load sensors 28 are normally closed and are connected to box 48 via transmission lines 50, 52. Box 48 is also connected to a source of power (not shown) and to power unit 16 via transmission line 54. The internal circuitry of box 48 is conventional and forms no part of the instant invention. All that is necessary is that the power unit energizing signals from switches 38, 40 be blocked when either sensor 28 is open.

In operation as the tension in cables 26 varies due to thermal effects, cable aging, etc., crank assembly 30, screw 34, power unit 16 and arm 42 will move to the left or right depending on whether the cables are becoming longer or shorter. As arm 42 moves, it contacts either switch 38 or 40, which energizes power unit 16 in the appropriate direction through control box 48. Power unit 16, in turn, moves actuator screw 34 in the appropriate direction to compensate for the expansion or contraction. In the event either of cables 26 should fail, load sensing devices 28 would prevent actuation of power unit 16. It should also be noted that during a control movement of system 20, i.e., when more tension is deliberately generated in one cable 26 than the other, the sensing device 28 in the slack cable would open to again prevent actuation of power unit 16 so that control movement override is avoided.

Figure 3:
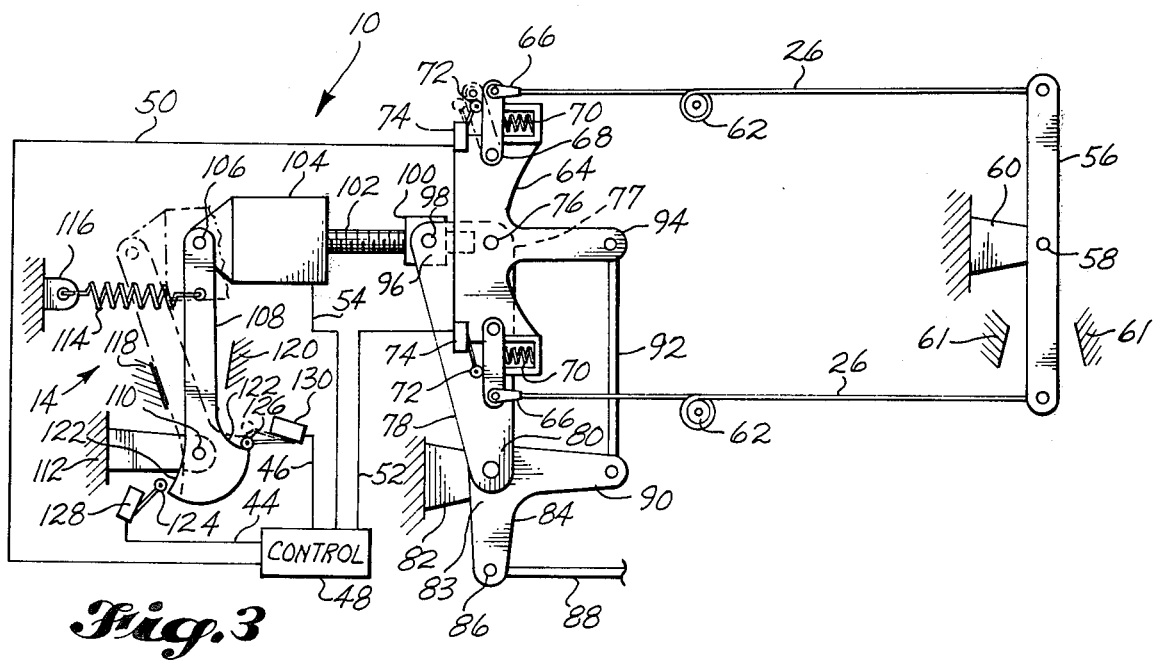
FIG. 3 shows a more detailed example of how the inventive concept may be put into practice.

FIG. 3 illustrates an example of the inventive tension regulation system in even greater detail. The control column of the aircraft is schematically represented by an input means 56. Input means 56 is pivotally attached at 58 to a fixed bracket 60. Stop means 61 serves to limit maximum movement of input means 56. As shown, pivot 58 is located at the center of input means 56 while control cables 26 are fixedly attached to each end thereof. Each cable 26 passes over a plurality of guide pulleys 62 (only two shown) between the control column or input means 56 and the flight control surfaces (not shown). Located between the input means 56 and the flight control surfaces is a tension regulation system 10. Each control cable 26 is attached to a crank 64 by means of a cable holding means 66. Each cable holding means 66 is pivotally attached to a switch actuator arm 68 which is in turn pivotally attached to crank 64 and is biased to the left (as viewed in FIG. 3) against the pull of cable 26, by a spring means 70. A sensor, which in the illustrated embodiment is a roller actuating arm 72 of a normally closed switch 74, rides against actuator link 68. In the event either cable 26 becomes slack because of, e.g., cable failure or control movement, the force of spring 70 will move actuator arm 68 to the left causing arm 72 to open switch 74. As will be discussed in greater detail below, opening of either switch 74 provides a signal that will prevent actuation of the tension regulation system.

Crank 64 is connected to one corner 77 of triangular link 75 by a pivot 76. Link 78 is pivotally connected, at another corner 80 to a fixed bracket 82. Bracket 82 is also connected to a central portion 83 of a bell crank 84. One arm 86 of bell crank 84 is connected to an output means 88 which operates, in any conventional manner, one or more aircraft control surface (not shown). The other arm 90 of bell crank 84 is pivotally connected to one end of a link 92. The other end of link 92 is pivotally connected to an arm 94 of crank 64. As may be seen in FIG. 3, arms 90 and 94 and links 78 and 92 form a parallelogram linkage arrangement, which permits the system to compensate for any nonlinearity which, for example, result after movement of crank 64, as tension is increased or decreased.

The third corner 96 of link 78 is pivotally connected at 98 to a threaded sleeve 100. Sleeve 100 threadably receives a screw actuator 102 that is reversibly driven by a power unit 104, which may be any conventional source of power, e.g. an electric or hydraulic motor. Unit 104 is pivotally attached at 106 to a lever 108 that is, in turn, pivotally mounted at 110 to a fixed bracket 112. Lever 108 is biased to the left (as viewed in FIG. 3) against the pull of cables 26 by a spring 114 which is connected to a fixed bracket 116. The biasing force exerted by spring 114 is selected to produce the desired rigging load or cable tension in the system. Fixed stops 118, 120 may be provided to limit the maximum extent of lever movement. Lever 108 carries a pair of cam surfaces 122 upon which ride sensors, e.g., roller actuating arms 124, 126 of sensing and signalling means 128, 130 respectively, which, in the illustrated embodiment, are normally open switches. As cables 26 change length, i.e., expand or contract, crank 64, link 78, screw 102, power unit 104 and lever 108 move to the left or right (as viewed in FIG. 3). As lever 108 moves, e.g. to the dotted line position shown in FIG. 3, normally open switch 130 will be closed by arm 126. Closing of switch 130 will actuate power unit 104 to move screw 102 so as to reduce slack in cables 26. If, for example, upper cable 26 should break, actuator arm 68 would be moved to the dotted line position causing roller arm 72 to open normally closed switch 74. Opening of switch 74 would, via transmission line 54 and control box 48, prevent power unit 104 from being actuated by switch 130.

Due to the relatively large amount of tension regulation provided by the instant arrangement, initial rigging of the cable system may be accomplished by simply centering the tension regulator and removing cable slack with screw 102 in its fully extended position. When power is applied, rigging load, or tension, is automatically increased to the desired value. Unless a cable requires replacement, re-rigging should not be necessary. Should power unit 104 fail in flight, rigging tension would, of course, change due to environmental conditions, however, such failure would cause no loss of control. Since screw speed is very slow, manual deactivation of the power unit would be possible in the event of malfunction.

There has thus been disclosed and described a control cable tension regulation arrangement which exhibits the advantages and achieves the objects set forth hereinabove. Variations and modifications will occur to persons skilled in the art without departing from the spirit and scope of the invention. Accordingly it is intended that the appended claims cover all such variations and modifications.

I claim:

1. A control cable tension regulation system adapted to regulate tension in an opposed cable control system of an aircraft, said tension regulation system comprising load cell means for creating a predetermined tension load in a control cable system capable of transmitting a control signal thereover; first sensing means for monitoring said predetermined tension load; first signal means responsive to said first sensing means for producing one signal if the sensed load is greater than said predetermined load and a different signal if the sensed load is less than said predetermined load, power means responsive to said first signal means for restoring said predetermined tension load and an actuator connected to said power means; at least two, movably mounted control cable attachment means arranged in opposed pairs and connected to said actuator; second sensing means for monitoring each cable attachment means and second signal means responsive to each of said second sensing means for producing a signal that will prevent actuation of said power means if said attachment means moves beyond a predetermined position.

2. A tension regulation system as claimed in claim 1 further comprising an actuator attached to said power means; at least two control cable attachment means attached to said actuator, each for holding individual control cables; second sensing means for sensing the cable tension load in each control cable and second signal means responsive to each said second sensing means for producing a signal if the cable tension load in either cable decreases beyond a predetermined value; said signal being operative to prevent actuation of said power means.

3. A tension regulation system as claimed in claims 1 or 2, further comprising first, second, third and fourth links, said actuator being attached to one of said links and said control cable attachment means being attached to another of said links; said links being connected together to form a parallelogram linkage arrangement whereby any system non-linearity will be compensated.

4. A tension regulation system as claimed in claims 1 or 2 wherein said second sensing means comprises an arm responsive to movement of said cable attachment means; said second signal means comprises a switch responsive to said arm and biasing means for biasing said attachment means.

5. A tension regulation system as claimed in claims 1 or 2, said actuator comprising a screw-threaded rod capable of substantial tension regulation movement whereby the cable control system is self-rigging.

6. A tension regulation system as claimed in claims 1 or 2 further comprising a control cable attached to each control cable attachment means at one end thereof; input means attached to the other ends of said control cables; a linkage arrangement attached to said control cable attachment means and output means, attached to said linkage arrangement, for transmitting control signals to flight control surfaces.

7. A tension regulation system as claimed in claim 6 wherein said linkage arrangement is a parallelogram linkage, said cable attachment means is mounted on one link of said parallelogram linkage and said output means being connected to another link of said parallelogram linkage, whereby system non-linearity is compensated.

8. A process of automatically controlling system tension in the control cable system of an aircraft, said system comprising at least two control cables arranged in an opposed pair, said process comprising the steps of:
establishing a desired cable system tension load value;
sensing the actual system load value;
generating a first signal if the actual system load value deviates above the desired system load value or a second signal if the actual system load value deviates below the desired system load value;
operating a power means in one direction in response to said first signal or an opposite direction in response to said second signal to eliminate said deviation and restore said control cable system to said desired tension load value;
establishing a desired cable tension load value for each control cable of said cable system;
establishing a permissible deviation from said desired cable tension load;
sensing the actual tension load value in each cable; and
preventing actuation of said power means if said actual cable tension load value exceeds said permissible deviation from said desired cable tension load value in either cable of an opposed pair.

* * * * *